US011297548B1

(12) United States Patent
Marupaduga

(10) Patent No.: US 11,297,548 B1
(45) Date of Patent: Apr. 5, 2022

(54) INITIATING HANDOVER OF A WIRELESS DEVICE BASED ON POWER HEADROOM AND PACKET DROPS

(71) Applicant: Sprint Spectrum LP, Overland Park, KS (US)

(72) Inventor: Sreekar Marupaduga, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 16/925,804

(22) Filed: Jul. 10, 2020

(51) Int. Cl.
*H04W 4/00* (2018.01)
*H04W 36/00* (2009.01)
*H04W 36/30* (2009.01)
*H04W 36/06* (2009.01)
*H04W 52/36* (2009.01)

(52) U.S. Cl.
CPC . *H04W 36/0094* (2013.01); *H04W 36/00837* (2018.08); *H04W 36/06* (2013.01); *H04W 36/30* (2013.01); *H04W 52/365* (2013.01)

(58) Field of Classification Search
None
See application file for complete search history.

(56) References Cited

U.S. PATENT DOCUMENTS

| 10,015,708 | B1* | 7/2018 | Rai | H04W 36/023 |
| 2015/0163811 | A1* | 6/2015 | Konstantinou | H04W 76/16 370/329 |
| 2017/0048127 | A1* | 2/2017 | Almodovar Chico | H04L 43/50 |
| 2017/0272960 | A1* | 9/2017 | Li | H04L 43/16 |
| 2018/0352092 | A1* | 12/2018 | Rajendran | H04W 36/0094 |

* cited by examiner

*Primary Examiner* — Suhail Khan

(57) ABSTRACT

A method for initiating handover of a wireless device includes identifying a wireless device exhibiting a low power headroom, the wireless device being attached to an access node on a first frequency band, determining a first incidence of packet drops associated with a data transmission from the wireless device on the first frequency band at a cell site router, and determining a second incidence of packet drops associated with another data transmission on a second frequency band of the access node at the cell site router. Based at least in part on the first incidence of packet drops being greater than the second incidence of packet drops, handover of the wireless device from the first frequency band to the second frequency band is initiated. Systems and devices relate to initiating handover of a wireless device.

20 Claims, 6 Drawing Sheets

US 11,297,548 B1

INITIATING HANDOVER OF A WIRELESS DEVICE BASED ON POWER HEADROOM AND PACKET DROPS

TECHNICAL BACKGROUND

As wireless networks evolve and grow, there are ongoing challenges in providing high-quality service to increasing numbers of wireless devices in various coverage areas of a wireless network. Different wireless devices are configured to use different types of applications (such as voice over IP, streaming, gaming, etc.), and each different application may optimally function with a different channel size or bandwidth. Further, radio access technologies (RATs) such as 5G New Radio (NR) are being implemented alongside existing RATs such as 3G and 4G Long Term Evolution (LTE), and wireless devices are increasingly becoming more capable of connecting to these RATs. Further, different RATs can be associated with different types of data transmissions, such as voice, data, streaming, low-latency, high-latency, etc. In other words, different RATs are utilized for applications that require different quality of service (QoS). These different types of network using various RATs and types of data transmissions may be referred to as heterogeneous networks.

A cell site router that is located in the wireless network between an access node and a gateway node may include one or more ports through which data transmissions are forwarded. The cell site router can include one or more ports, each being operatively connected to a baseband unit or other hardware. Due to congestion at the cell site router resulting from a high volume of transmissions, packet drops may occur at the cell site router. As a result, the wireless device may be required to re-transmit the lost data, thereby consuming additional network resources and additional power of the wireless device and resulting in a sub-optimal user experience for users of wireless devices connected to the network.

OVERVIEW

Exemplary embodiments described herein include systems, methods, and node for adjusting one or both of a buffer status reporting frequency and a power headroom reporting frequency. For example, a method for initiating handover of a wireless device comprises identifying a wireless device exhibiting a low power headroom, the wireless device being attached to an access node on a first frequency band. The method further comprises determining a first incidence of packet drops associated with a data transmission from the wireless device on the first frequency band at a cell site router and determining a second incidence of packet drops associated with another data transmission on a second frequency band of the access node at the cell site router. Based at least in part on the first incidence of packet drops being greater than the second incidence of packet drops, handover of the wireless device from the first frequency band to the second frequency band is initiated.

An exemplary processing node described herein for initiating handover of a wireless device is configured to perform operations comprising identifying a wireless device exhibiting a low power headroom, the wireless device being attached to an access node on a first frequency band. The processing node is further configured to determine a first incidence of packet drops associated with a data transmission from the wireless device on the first frequency band at a cell site router and to determine a second incidence of packet drops associated with another data transmission on a second frequency band of the access node. Based at least in part on the first incidence of packet drops being greater than the second incidence of packet drops, the processing node initiates a handover of the wireless device from the first frequency band to the second frequency band is initiated.

An exemplary system described herein for initiating handover of a wireless device comprises a first baseband unit communicatively coupled to a core network, a second baseband unit communicatively coupled the core network, and a processor communicatively coupled to the first baseband unit and the second baseband unit. The processor is configured to perform operations comprising identifying a wireless device transmitting data through the first baseband unit and exhibiting a low power headroom, determining a first incidence of packet drops associated with a data transmission from the wireless device at the first baseband unit, and determining a second incidence of packet drops associated with a data transmission at the second baseband unit. Based at least in part on the first incidence of packet drops being greater than the second incidence of packet drops, the system initiates handover of the wireless device from the first baseband unit to the second baseband unit.

DETAILED DESCRIPTION

Figure 1:
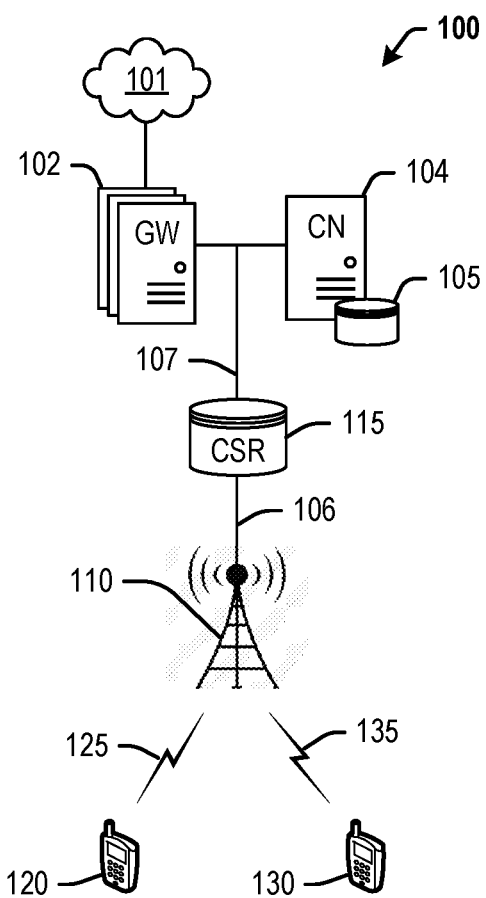
FIG. 1 depicts an exemplary system for initiating handover of a wireless device.

Exemplary embodiments described herein include systems, methods, and processing nodes for initiating handover of a wireless device. Due to drops occurring at an access node to which the wireless device is attached, the wireless device may be required to re-transmit the lost data, negatively impacting the overall throughput and efficiency of the network and user experience. For example, in situations in which the wireless device has relatively low power headroom, the wireless device may have insufficient headroom to retransmit the data without an apparent interruption in service. Embodiments described herein relate to methods and systems for initiating handover of wireless devices having low power headroom from a first access node and/or frequency band to a second access node and/or frequency band exhibiting a lower incidence of packet drops than the first access node and/or frequency band.

Packet drops may occur at a cell site router associated with an access node. Exemplary cell site routers described herein include any node that is configured to route incoming data packets from a network/gateway node to an access node, and to route outgoing data packets from the access node (and originating at wireless devices attached thereto) to the network/gateway node. In some exemplary embodiments, a cell site router can have multiple ports, each of which is communicatively coupled to a respective baseband unit. Dropped packets occurring the cell site router can negatively impact an overall throughput and quality of service for wireless devices, particularly when the access nodes serving the wireless devices are heavily loaded and/or when the wireless device exhibits low power headroom. The incidence of packet drops occurring at the cell site router can be, for example, a rate of packet drops satisfying a predetermined criterion, such as a number of packet drops exceeding a predetermined number over a specified period of time.

The power headroom of the wireless device can be determined, for example, based on MAC control element (MAC CE) power headroom reporting of the wireless device. As used herein, a low power headroom can be a power headroom satisfying a predetermined criterion, such as power headroom equaling or falling below a certain threshold. Based on determination of low power headroom of the wireless device, an incidence of packet drops occurring at the cell site router associated with the access node (e.g., first access node) to which the wireless device is attached is determined.

Based on the determined low power headroom of the wireless device and the incidence of packet drops occurring at the cell site router associated with the access node to which the wireless device is attached, another access node (e.g., a second access node) within communication range of the wireless device is identified. If an incidence of packet drops (e.g., number of packet drops over a specified period of time) occurring at a cell site router associated with the second access node is lower than the incidence of packet drops at the cell site router associated with the first access node, handover of the wireless device from the first access node to the second access node is initiated. The lower incidence of packet drops occurring at the cell site router associated with the second access node can contribute to higher quality of service as compared to the first access node due at least in part to the wireless device's low power headroom and inability to retransmit dropped packets.

In some exemplary embodiments, handover may be initiated from one frequency band on the first access node to a second frequency band on the second access node. Alternatively, in a situation where a single access node is communicatively coupled to a cell site router with multiple ports and associated baseband units and other hardware supporting multiple frequency bands, the cell site router or a port thereof associated with one frequency band may exhibit a higher incidence of packet drops than a port associated with another frequency band of the same access node. In this situation, handover of the wireless device can be from the port experiencing higher packet drops to the port experiencing fewer packet drops. Such ports can be associated with different frequency bands of the same radio access technology (RAT), the same frequency bands of the same RAT, or different RATs. For example, a cell site router according to the disclosure can include a 4G port and a 5G port, each port being connected to a different baseband unit.

The handover of the wireless device from the first access node to another access node exhibiting a lower incidence of dropped packets, or from one port to another associated with the same or a different frequency band and/or RAT and exhibiting a lower incidence of dropped packets, may result in an increase in quality of service due for the wireless device with low power headroom. For example, the lower incidence of packet drops lessens the requirement for the wireless device to retransmit the lost data, which the wireless device may frequently be incapable of due to low power headroom.

FIG. 1 depicts an exemplary system for initiating handover of a wireless device. System 100 comprises a communication network 101, gateway node(s) 102, controller node 104, access node 110, cell site router 115, and wireless devices 120 and 130. In other embodiments, any other combination of cell site routers, access nodes, and wireless devices may be evident to those having ordinary skill in the art in light of this disclosure. In this exemplary embodiment, access node 110 may be a macrocell access node configured to deploy wireless air-interfaces 125, 135 to which wireless devices 120, 130 can respectively attach. For example, access node 110 can include a combination of a 4G eNodeB and a 5G gNodeB. In other words, the access node 110 can comprise antennae that are configured to communicate using 4G LTE (i.e. a first radio access technology, "RAT") as well as antennae that are configured to communicate using 5G NR (a second RAT). Further, the access node 110 can include a plurality of antennae (or antenna elements), a portion of which is configured to deploy a first bandwidth or RAT (e.g. 4G LTE), and a portion of which is configured to deploy a second bandwidth or RAT (e.g. 5G NR). Consequently, wireless devices 120, 130 are respectively capable of attaching to 4G and 5G RATs. Further, cell site router 115 includes any node that is configured to route incoming data packets from network 101 and/or gateway node(s) 102 to access node 110 (and wireless devices 120, 130), and to route outgoing data packets received from the access node 110 (and originating at wireless devices 120, 130) to the gateway node(s) 102 and/or network 101.

Access node 110 can be any network node configured to provide communication between wireless devices 120, 130 and communication network 101, including standard access nodes such as a macro-cell access node, base transceiver station, a radio base station, an eNodeB device, an enhanced eNodeB device, or the like. In an exemplary embodiment, a macro-cell access node 110 can have a coverage area in the range of approximately five kilometers to thirty-five kilometers and an output power in the tens of watts. Further, access node 110 may comprise any short range, low power, small-cell access nodes such as a microcell access node, a picocell access node, a femtocell access node, or a home eNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107.

Wireless device 120 may be any device, system, combination of devices, or other such communication platform capable of communicating wirelessly with access node 110 using one or more frequency bands deployed therefrom. Wireless device 120 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 130. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include S1, S4, S5, S11, S1-MME, or S1-U communication links. Other wired or wireless protocols can also be used. Communication links 106, 107 can be a direct link or might include various equipment, intermediate components, systems, and networks. Communication links 106, 107 may comprise many different signals sharing the same link.

Gateway node(s) 102 can be any network node configured to interface with other network nodes using various protocols. Gateway node(s) 102 can communicate user data over system 100. Gateway node(s) 102 can be standalone computing devices, computing systems, or network components, and can be accessible, for example, by a wired or wireless connection, or through an indirect connection such as through a computer network or communication network. For example, gateway node(s) 102 can include a serving gateway (S-GW) and/or a public data network gateway (P-GW), etc. One of ordinary skill in the art would recognize that gateway node(s) 102 are not limited to any specific technology architecture, such as Long Term Evolution (LTE) and can be used with any network architecture and/or protocol.

Each of gateway node(s) 102 can comprise a processor and associated circuitry to execute or direct the execution of computer-readable instructions to obtain information. Gateway node(s) 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node(s) 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as historical trends of packet drops at cell site router 115, associations between buffer size adjustments and different QoS requirements, and so on. This information may be requested by or shared with cell site router 115, gateway node(s) 102 and/or access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Hardware and/or software of the system 100 are configured to initiate handover of a wireless device, such as wireless devices 120 or 130, from access node 110 to another, neighboring access node, from one frequency band deployed by the access node 110 to another frequency band deployed by the access node 110, or from one RAT of the access node 110 to another RAT of the access node 110. Such handovers can be based on a wireless device (such as wireless devices 120 or 130) exhibiting power headroom satisfying a predetermined criterion, such as a power headroom equaling or falling below a predetermined threshold.

For example, if the power headroom of the wireless device equals or falls below a threshold, and if packet drops are occurring at the cell site router 115, the system 100 determines whether a different access node exhibits a lower incidence of packet drops than the cell cite router 115. If a different access node within communication range of the wireless device is identified and has a lower incidence of packet drops compared to access node 110, the system 100 may initiate handover of the wireless device from the access node 110 to the access node exhibiting a lower incidence of packet drops.

Further, in exemplary embodiments, the wireless device can be handed over from one frequency band to another frequency band deployed by access node 110. For example, if a wireless device (such as wireless device 120 or 130) is exhibiting a low power headroom, and packet drops are occurring at a baseband unit associated with a first baseband frequency and attached a first port of the cell site router 115, the system 100 can determine if a different baseband unit associated with a second baseband frequency and attached to a second port of the cell site router 115 exhibits a lower incidence of packet drops as compared to the first frequency. If the second frequency band exhibits a lower incidence of packet drops compared to the first frequency band, the system 100 can initiate handover of the wireless device from the first frequency band to the second frequency band.

Figure 2:
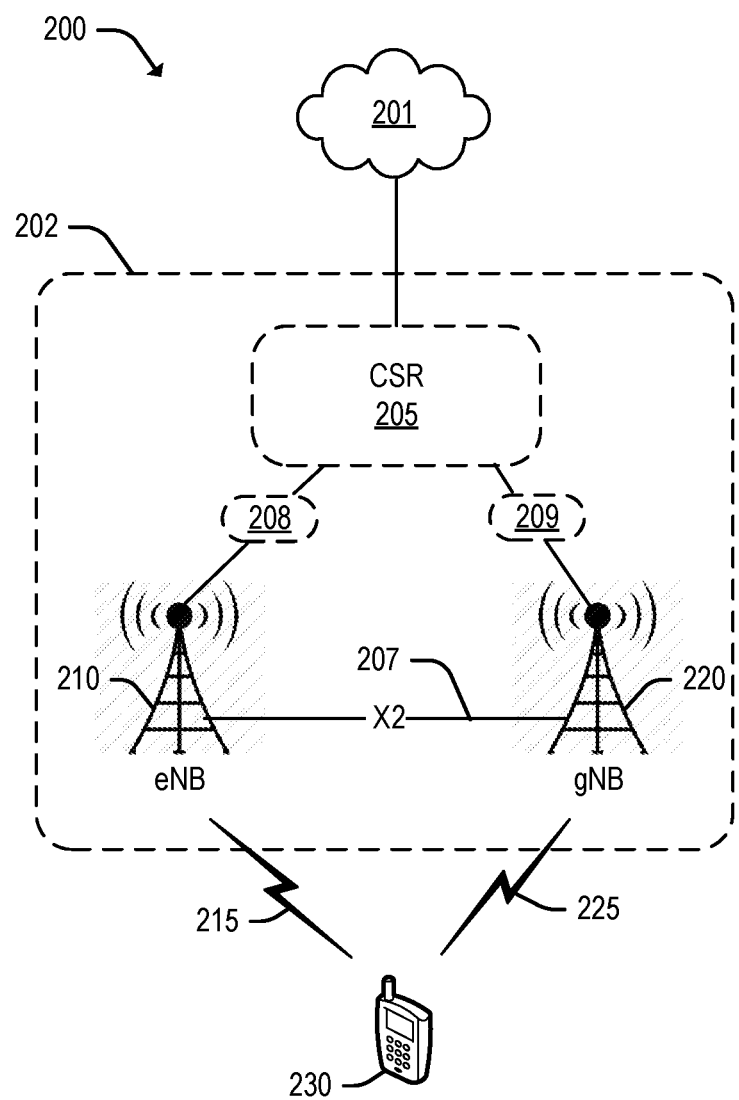
FIG. 2 depicts another exemplary system for initiating handover of a wireless device.

Exemplary embodiments of the disclosure can be used with systems including multiple RATs. For example, FIG. 2 depicts an exemplary system 200 for E-UTRAN-NR Dual Connectivity (EN-DC) using 4G LTE and 5G NR. System 200 includes a communication network 201, a radio access network 202, and a wireless device 230. Radio access network further includes at least a cell site router 205, and access nodes 210, 220. Cell site router 205 can include any network node that is configured to route incoming data packets from network 201 to wireless device 230 via access node(s) 210, 220, and to route outgoing data packets received from the wireless device 230 via access node(s) 210, 220 to the network 201. Therefore, network 201 can include any combination of networks, including a core network, intermediate/backhaul network, or packet data network (PDN). Persons having ordinary skill in the art may note that although only access nodes 210, 220, cell site router 205, and network 201 are illustrated in FIG. 2, other components such as gateways, controller nodes, user plane functions, etc. may be included as well.

In this exemplary embodiment, access node 210 can include an eNodeB, and access node 220 can include a gNodeB. For example, access node 210 can be configured to deploy a wireless interface 215 using a first radio access technology (RAT), e.g. 4G LTE, and access node 220 can be configured to deploy a second wireless interface 225 using a second RAT, e.g. 5G NR. Each RAT can be configured to utilize a different frequency band or sub-band, a different channel size or bandwidth, and so on. For example, the 5G NR wireless interface 225 can be configured to utilize higher frequencies and larger channel bandwidths than the 4G LTE wireless interface 215. Further, access nodes 210, 220 can be configured to communicate using both RATs at the same time. For example, dual connections can be set up with wireless device 230 using both 4G and 5G air interfaces 215, 225 respectively, the 4G wireless interface 215 being used to transmit control information, and the 5G wireless interface 225 being used to transmit data information. For example, a processing node within system 200 (for example, communicatively coupled to access nodes 210, 220, or any other network node) can be configured to determine whether wireless device 230 is capable of communicating using both RATs, and instruct the access node 210 to broadcast an indicator in, for example, a system information message. Responsive to the indicator, wireless device 230 can attach to access node 210 which can use the 4G carrier to control and set up a dual connectivity session with wireless device 230. In other words, control information (including SIB messages) is transmitted from the access node 210 using the 4G LTE air interface, while the 5G NR air interface is utilized for transmission of data. Using the 5G RAT for data transmissions is advantageous, as 5G provides higher bandwidths and frequencies versus 4G. In addition, while different carriers offer different channel bandwidths, certain combinations of carriers may provide a greater aggregate channel bandwidth. In an exemplary embodiment utilizing multiple input multiple output (MIMO), wireless device 230 can receive a MIMO data stream using the 5G NR wireless interface, with control signaling that enables the MIMO data stream using the 4G wireless interface.

Access nodes 210 and 220 can be coupled to the cell site router through respective baseband units 208 and 209, each of which may be communicatively coupled to a separate port of the cell site router 205. Additionally, within radio access network 202, access nodes 210 and 220 can be coupled via a direct communication link 207, which can include an X2 communication link. Access nodes 210 and 220 can communicate control and data information across X2 communication link 207. In an exemplary embodiment, the access node 220 includes logic that determines how to allocate data packets between access nodes 210 and 220.

Figure 3:
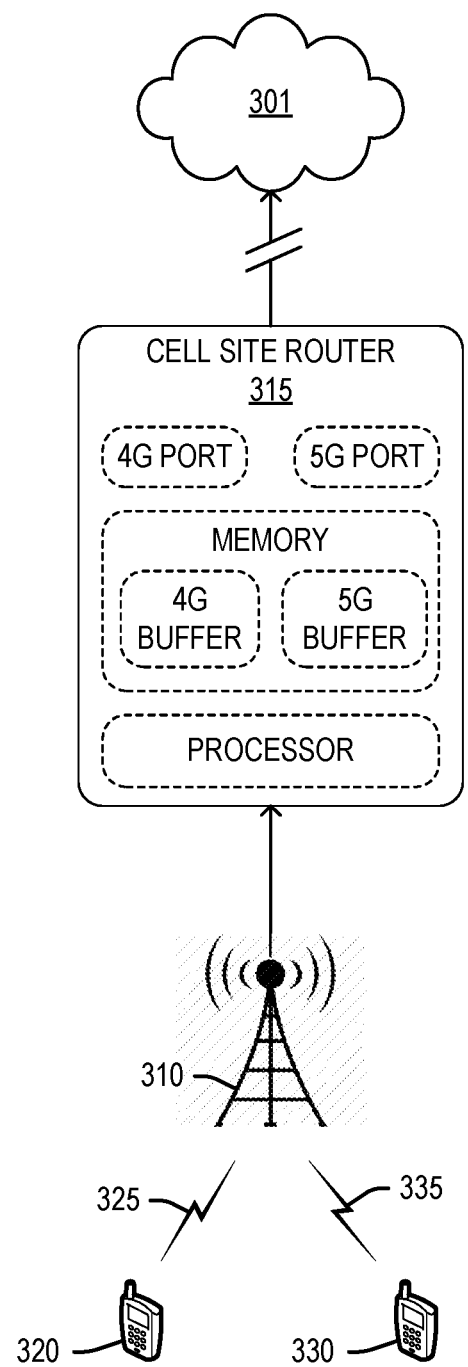
FIG. 3 depicts a schematic of an exemplary cell site router.

FIG. 3 depicts a schematic of an exemplary cell site router. Similar to system 100, cell site router 315 is illustrated as being coupled to an access node 310, and capable of communicating with core network 301 (which can include gateway nodes, controller nodes, and other interfaces to an external network). Cell site router 315 can include any node that is configured to route data packets between core network 302 and access node 310 via one or more ports. In addition to a processor and a memory, cell site router 315 is illustrated as having 4G ports and 5G ports which are used to transport data packets that are associated with 4G and/or 5G RATs. In addition, the memory stores at least a 4G buffer and a 5G buffer, respectively associated with the 4G port and the 5G port. Further, cell site router 315 (or a processing node communicatively coupled thereto) is configured to determine a packet drops associated with a data transmission from wireless device(s) 320 and 330. The cell site router 315 can be configured to receive a data transmission from the access node 310 and forward the data transmission to the destination node (via the network 301 and/or any intervening gateway nodes). In other words, the data transmission may be an uplink data transmission.

The uplink data transmission traverses a buffer of the cell site router 315 that is associated with a RAT that the data transmission utilizes, such as 3G, 4G, 5G, TDD, FDD, etc. Thus, the cell site router 315 may include a plurality of ports as shown herein, each associated with a different radio access technology. For example, data transmissions using 4G are transmitted via a 4G port of the cell site router 315, data transmissions using 5G are transmitted via a 5G port of the cell site router 315, and so on.

Figure 4:
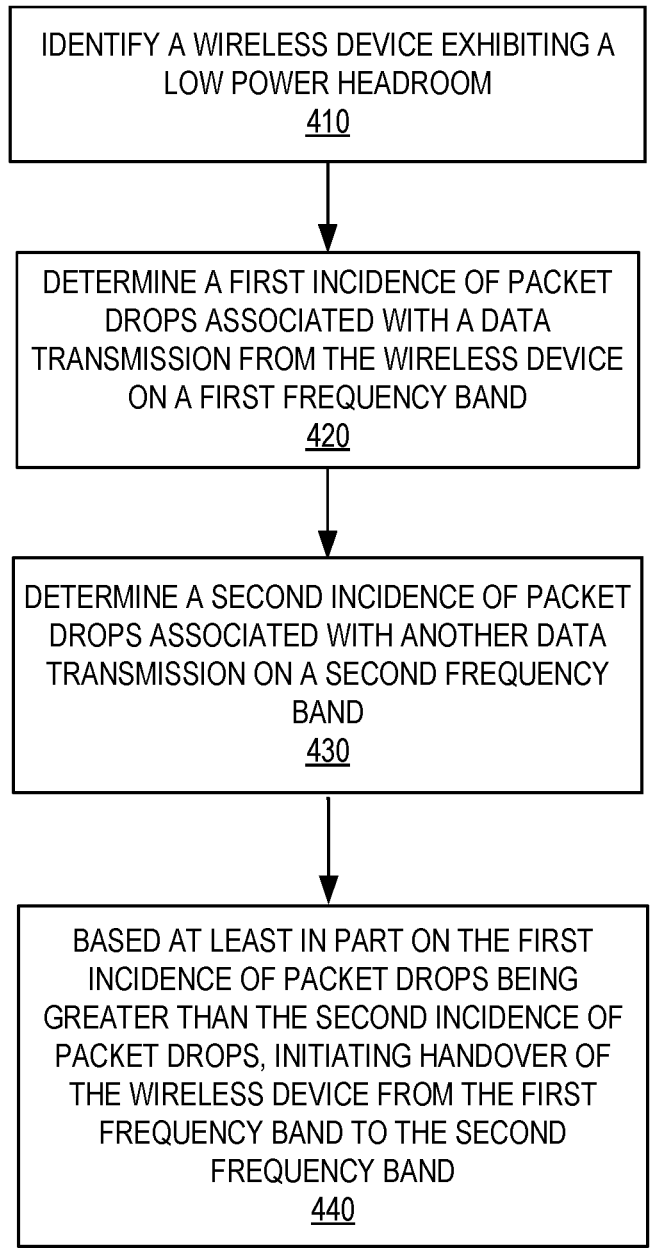
FIG. 4 depicts an exemplary method for initiating handover of a wireless device.

FIG. 4 depicts an exemplary method for initiating handover of a wireless device. Although FIG. 4 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 410, the method includes identifying a wireless device exhibiting a low power headroom and being attached to an access node, such as access node 110, 210, 220, or 310. The wireless device can be attached to the access node on a first frequency band. The low power headroom condition of the wireless device can be determined based on a power headroom as reported, e.g., by a MAC CE, satisfying a predetermined criterion, such as equaling or falling below a predetermined threshold. At 420, a first incidence (e.g., rate) of packet drops associated with a data transmission from the wireless device on a first frequency band is determined. Such packet drops may occur at the cell site router. Alternatively, packet drops may occur at a baseband unit communicatively coupled to a port of the cell site router and associated with the first frequency band. The incidence of packet drops can be, for example, a rate of packet drops, calculated as a number of packet drops over a specified period of time.

At 430, a second incidence of packet drops associated with another data transmission on a second frequency band is determined. Such data transmissions can be, for example, uplink and/or downlink data transmissions associated with one or more other wireless devices attached to the access node on the second frequency band. The incidence of packet drops can be, for example, a rate of packet drops, calculated as a number of packet drops over a specified period of time.

At 440, based at least in part on the first incidence of packet drops being greater than the second incidence of packet drops, handover of the wireless device from the first frequency band to the second frequency band is initiated. In some exemplary embodiments, the first incidence of packet drops is required to be greater than the second incidence of packet drops by some predetermined amount in order to initiate handover of the wireless device. For example, handover may only be initiated if the first rate of packet drops is higher than the second rate of packet drops by some specified value. Alternatively, or additionally, handover may only be initiated if a ratio of the first rate of packet drops and the second rate of packet drops exceeds a specified value. Further, in some exemplary embodiments, handover of the wireless device may be from one frequency to another frequency on the same band, with the different frequencies being supported by different baseband units operatively coupled to the same cell site router (such as cell site router 115).

Figure 5:
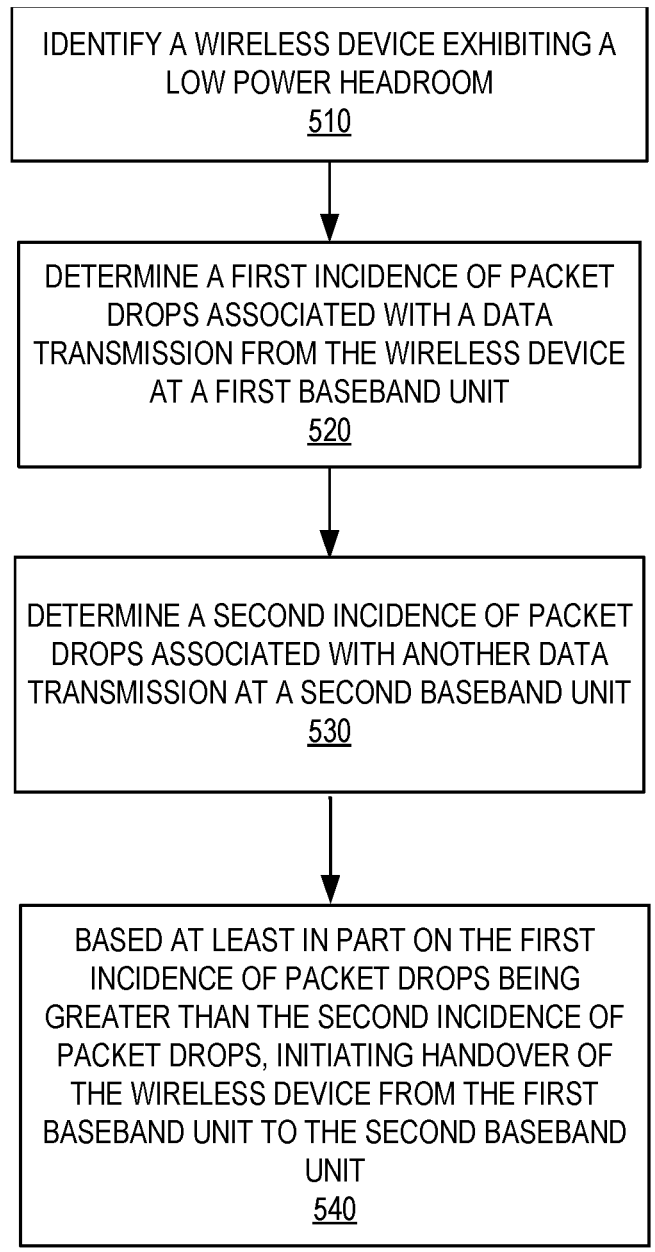
FIG. 5 depicts another exemplary method for initiating handover of a wireless device.

FIG. 5 depicts an exemplary method for initiating handover of a wireless device. Although FIG. 5 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 510, the method includes identifying a wireless device exhibiting a low power headroom and transmitting data through a first baseband unit, such as baseband units 208 or 209. The low power headroom condition of the wireless device can be determined based on a power headroom as reported, e.g., by a MAC CE, satisfying a predetermined criterion such as equaling or falling below a predetermined threshold. At 520, a first incidence (e.g., rate) of packet drops associated with uplink transmissions from the wireless device is determined. Such packet drops may occur at the cell site router. Alternatively, packet drops may occur at a baseband unit communicatively coupled to a port of the cell site router and associated with a frequency band in use by the wireless device. The incidence of packet drops can be, for example, a rate of packet drops, calculated as a number of packet drops over a specified period of time.

At 530, a second incidence of packet drops associated with another data transmission, such as uplink and/or downlink transmissions associated with another wireless device, through a second baseband unit is determined. The first baseband unit and the second baseband unit can be communicatively coupled to different ports of the same cell site router and be associated with a single access node. Alternatively, the first baseband unit and the second baseband unit can be communicatively coupled to different cell site routers and be associated with different access nodes. In exemplary embodiments, the first and second baseband units may be associated with different RATs of the same access node, or different RATs of different access nodes. The second incidence of packet drops can be, for example, a rate of packet drops, calculated as a number of packet drops over a specified period of time.

At 540, based at least in part on the first incidence of packet drops being greater than the second incidence of packet drops, handover of the wireless device from the first baseband unit to the second baseband unit is initiated. In some exemplary embodiments, the first incidence of packet drops is required to be greater than the second incidence of packet drops by some predetermined amount in order to initiate handover of the wireless device. For example, handover may only be initiated if the first rate of packet drops is higher than the second rate of packet drops by some specified value. Alternatively, or additionally, handover may only be initiated if a ratio of the first rate of packet drops and the second rate of packet drops meets or exceeds a specified value. Further, in some exemplary embodiments, handover of the wireless device from the first baseband unit to the second baseband unit may be from a given frequency band to the second baseband unit on the same frequency band, or from the first baseband unit and on the first frequency band to the second baseband unit on a different frequency band.

Further, the methods, systems, devices, networks, access nodes, and equipment described herein may be implemented with, contain, or be executed by one or more computer systems and/or processing nodes. The methods described herein may also be stored on a non-transitory computer readable medium. Many of the elements of system 100 may be, comprise, or include computers systems and/or processing nodes. This includes, but is not limited to: cell site router 115, gateway node(s) 102, controller node 104, access node 110, and/or network 101.

Figure 6:
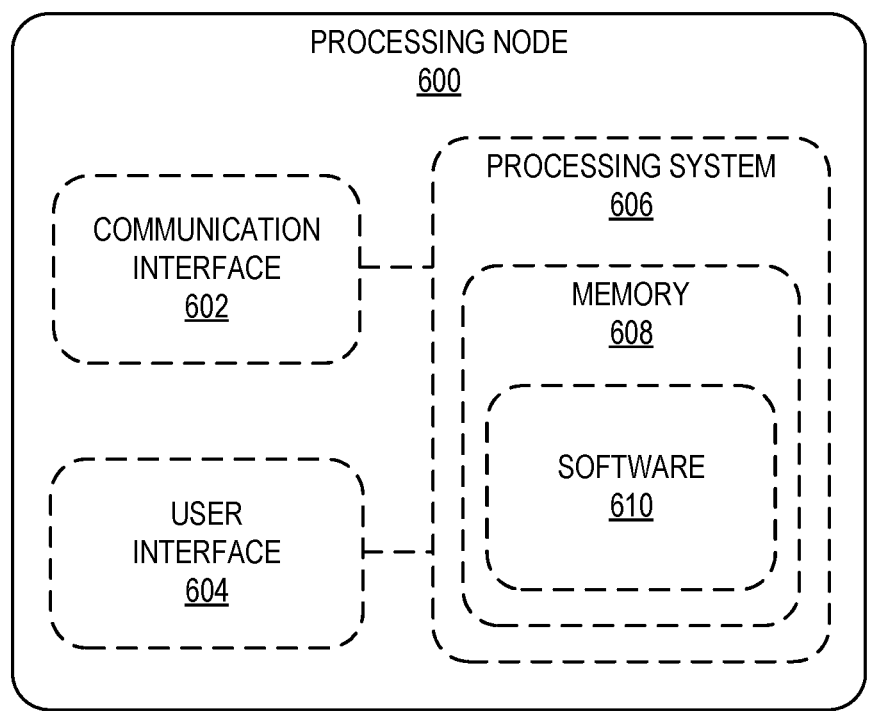
FIG. 6 depicts an exemplary processing node for initiating handover of a wireless device.

FIG. 6 depicts an exemplary processing node for scheduling resources for relay access nodes in a wireless network. Processing node 600 comprises a communication interface 602, user interface 604, and processing system 606 in communication with communication interface 602 and user interface 604. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. For example, storage 608 may include a buffer. Software 610 may include computer programs, firmware, or some other form of machine-readable instructions, including an operating system, utilities, drivers, network interfaces, applications, or some other type of software. For example, software 610 may include a module for performing transmission power control operations described herein. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for initiating handover of a wireless device, the method comprising:
    identifying a wireless device exhibiting a low power headroom, the wireless device being attached to an access node on a first frequency band, determining a first incidence of packet drops associated with a data transmission from the wireless device on the first frequency band at a cell site router;
    determining a second incidence of packet drops associated with another data transmission on a second frequency band of the access node at the cell site router; and
    based at least in part on the first incidence of packet drops being greater than the second incidence of packet drops and on the low power headroom, initiating a handover of the wireless device from the first frequency band to the second frequency band.

2. The method of claim 1, wherein the first frequency band is associated with a first baseband unit and the second frequency band is associated with a second baseband unit.

3. The method of claim 2, wherein the first baseband unit is communicatively coupled to a first port of the cell site router and the second baseband unit is communicatively coupled to a second port of the cell site router.

4. The method of claim 1, wherein identifying a wireless device exhibiting a low power headroom comprises identifying a wireless device exhibiting a power headroom below a predetermined threshold.

5. The method of claim 1, wherein the first frequency band and the second frequency band are associated with a same radio access technology.

6. The method of claim 1, wherein the first frequency band is associated with a first radio access technology and the second frequency band is associated with a second radio access technology.

7. The method of claim 1, wherein the first incidence of packet drops comprises a first rate of packet drops and the second incidence of packet drops comprises a second rate of packet drops.

8. A processing node for initiating handover of a wireless device, the processing node being configured to perform operations comprising:
    identifying a wireless device exhibiting a low power headroom, the wireless device being attached to an access node on a first frequency band;
    determining a first incidence of packet drops associated with a data transmission from the wireless device on the first frequency band at a cell site router;
    determining a second incidence of packet drops associated with another data transmission on a second frequency band of the access node; and
    based at least in part on the first incidence of packet drops being greater than the second incidence of packet drops and on the low power headroom, initiating a handover of the wireless device from the first frequency band to the second frequency band.

9. The processing node of claim 8, wherein the first frequency band is associated with a first baseband unit and the second frequency band is associated with a second baseband unit.

10. The processing node of claim 9, wherein the first baseband unit is communicatively coupled to a first port of the cell site router and the second baseband unit is communicatively coupled to a second port of the cell site router.

11. The processing node of claim 8, wherein identifying a wireless device exhibiting a low power headroom comprises identifying a wireless device exhibiting a power headroom below a predetermined threshold.

12. The processing node of claim 8, wherein the first frequency band and the second frequency band are associated with a same radio access technology.

13. The processing node of claim 8, wherein the first frequency band is associated with a first radio access technology and the second frequency band is associated with a second radio access technology.

14. The processing node of claim 8, wherein the first incidence of packet drops comprises a first rate of packet drops and the second incidence of packet drops comprises a second rate of packet drops.

15. A system for initiating handover of a wireless device, the system comprising:
    a first baseband unit communicatively coupled to a core network;

a second baseband unit communicatively coupled the core network; and a processor communicatively coupled to the first baseband unit and the second baseband unit, the processor being configured to perform operations comprising:

identifying a wireless device transmitting data through the first baseband unit and exhibiting a low power headroom;

determining a first incidence of packet drops associated with a data transmission from the wireless device at the first baseband unit;

determining a second incidence of packet drops associated with a data transmission at the second baseband unit; and based at least in part on the first incidence of packet drops being greater than the second incidence of packet drops and on the low power headroom, initiating a handover of the wireless device from the first baseband unit to the second baseband unit.

16. The system of claim 15, wherein the first baseband unit is communicatively coupled to a first access node and the second baseband unit is communicatively coupled to a second access node.

17. The system of claim 15, wherein the first baseband unit and the second baseband unit are communicatively coupled to a single access node.

18. The system of claim 15, wherein the first baseband unit is configured to deploy a first radio access technology and the second baseband unit is configured to deploy a second radio access technology.

19. The system of claim 15, wherein identifying a wireless device transmitting data through the first baseband unit and exhibiting a low power headroom comprises identifying a wireless device exhibiting power headroom below a predetermined threshold.

20. The system of claim 15, wherein the first incidence of packet drops comprises a first rate of packet drops and the second incidence of packet drops comprises a second rate of packet drops.

* * * * *